United States Patent [19]

Yang

[11] Patent Number: 4,851,747
[45] Date of Patent: Jul. 25, 1989

[54] NON-PRECISE HEAT CONTROL OPERATION PERIODIC POSITIVE & REVERSE CIRCULATING FAN

[76] Inventor: Tai-Her Yang, 5-1 Taipin St.,, Si-Hu Town, Dzan-Hwa, Taiwan

[21] Appl. No.: 167,972

[22] Filed: Mar. 14, 1988

[30] Foreign Application Priority Data

Mar. 19, 1987 [GB] United Kingdom ............... 8706574

[51] Int. Cl.$^4$ .............................................. H02P 3/20
[52] U.S. Cl. ..................................... 318/471; 318/739
[58] Field of Search ............... 318/264, 471, 472, 473, 318/746, 747, 748, 256, 280, 739; 160/331; 98/40.05, 42.09, 42.1, 42.12; 165/16

[56] References Cited

U.S. PATENT DOCUMENTS

| | | | |
|---|---|---|---|
| 1,820,764 | 8/1931 | Abt | 318/471 |
| 3,096,468 | 7/1963 | Kinsworthy | 318/746 |
| 3,601,675 | 8/1971 | Radtke | 318/471 |
| 3,993,940 | 11/1976 | Volk, Jr. | 318/747 |
| 4,689,533 | 8/1987 | Yang | 318/471 |

Primary Examiner—David Smith, Jr.
Attorney, Agent, or Firm—Leonard Bloom

[57] ABSTRACT

A manually controlled positive and reverse circulating fan is used in room, usually, when in summer to blow air is downward so that the cool air at the lower level can be spread into every corner of the room. In winter, the fan is operated reversely and the warmer air at higher level can be spread evenly down in the room, thus the room temperature can be kept even and the energy can be saved. However, because of the limitation of the room space shape, there are still spaces that the air flow can not reach. This design, with a periodic positive/reverse switch operation, controls the ceiling fan to operate positively or reversely in periodicity so that it may further improve, the function of stirring the air evenly. This design can be used also ventilators/for air intake/exist as well.

2 Claims, 3 Drawing Sheets 4,851,747

NON-PRECISE HEAT CONTROL OPERATION PERIODIC POSITIVE & REVERSE CIRCULATING FAN

BACKGROUND OF THE INVENTION

This invention is a control circuit for a nonprecision, thermally operated, periodic positive & reverse circulating fan. It is an improvement over one form of control circuit disclosed in U.S. Pat. No. 4,689,533, titled "Controlled Fan", issued Aug. 25, 1987 to Tai-Her Yang, inventor of the present invention.

SUMMARY OF THE INVENTION

A manually controlled positive & reverse circulating ceiling fan is used in room, usually, when in summer to blow air is downward so that the cool air at the lower level can be spread into every corner of the room. In winter, the fan is operated reversely and the warmer air at higher level can be spread evenly down in the room, thus the room temperature can be kept even and energy can be saved. However, because of the limitation of the room space shape, there are still spaces that the air flow can not reach. This design, with a periodic positive/reverse switch operation, controls the ceiling fan to operate positively or reversely in periodicity so that it may further improve the function of stirring the air evenly. This design can be used also for ventilators for air intake/exhaust as well. This invention has the advantage of providing periodic forward/reverse operation for a ceiling fan or ventilator fan similar to the control of U.S. Pat. No. 4,689,533 at lower manufacturing cost.

BRIEF DESCRIPTION OF THE DRAWINGS

FIG. 1—1 is an implementation example that enhances the cut off capacity by using a higher rated motor with auxiliary relay.

DETAILED DESCRIPTION OF THE INVENTION

As well-known, cool air descends and warm air rises and the distance between the air conditioning equipment (air conditioner or heater) will cause temperature variations in a room. To defeat this defect, one uses the ceiling fan to stir the air. In summer, the fan blows the cool air downward, in winter the warm air is blown upward. The room temperature can thus be kept evenly. However, because of the room space shape, there are still some spaces in which the air can not flow evenly. The same situation exists in using a ventilator or a draft fan.

The application design is to make the fan to be operated clockwise/counter-clockwise periodically by using a low cost thermally operated periodic positive/negative switch to achieve the effect of even air stirring.

Figure 1:
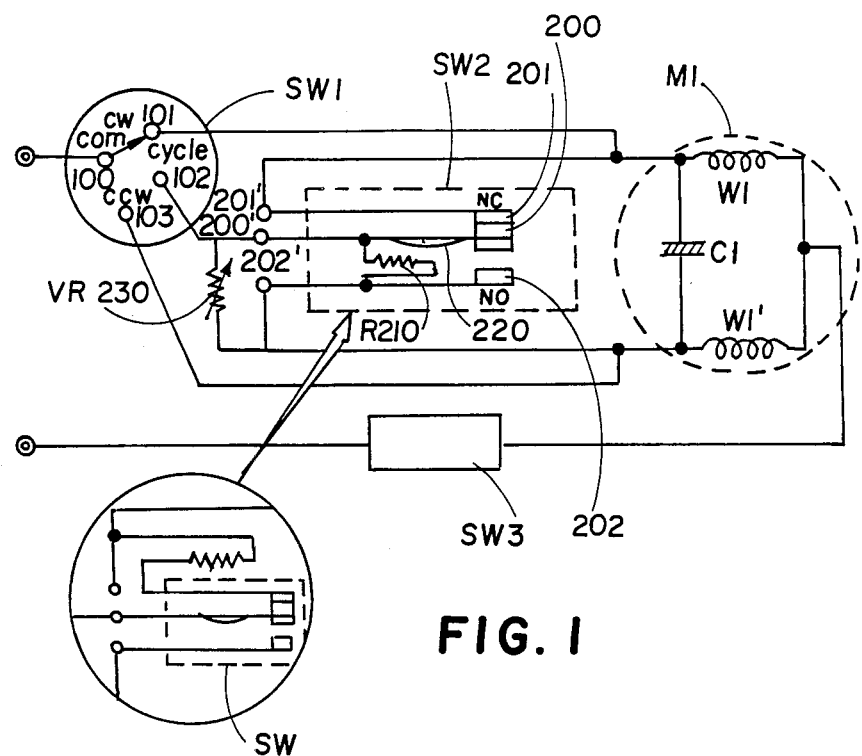
FIG. 1 is the circuit scheme of the heat control switch which makes the fan to operate positively and reversely peroidically.
Figure 2:
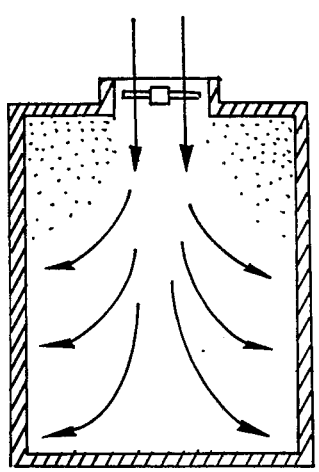
FIGS. 2-5 are the function diagramtic drawings of FIG. 1.
Figure 3:
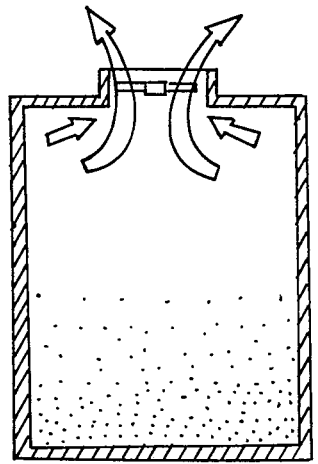
Figure 1:
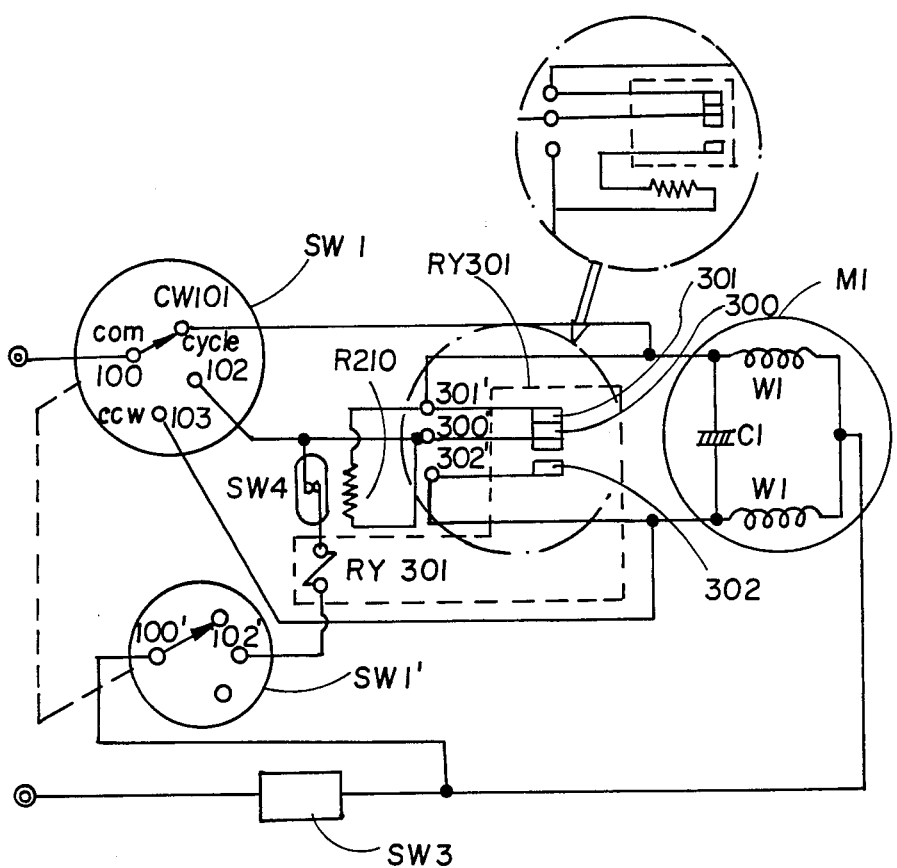
Figure 4:
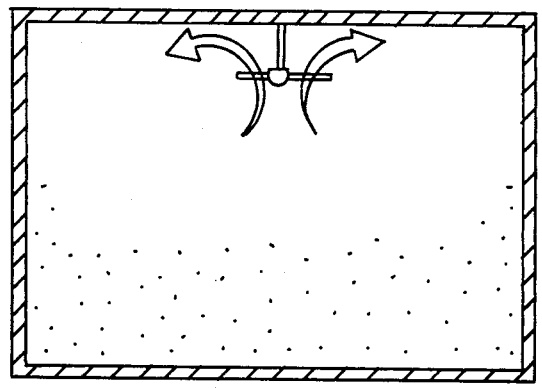
Figure 5:
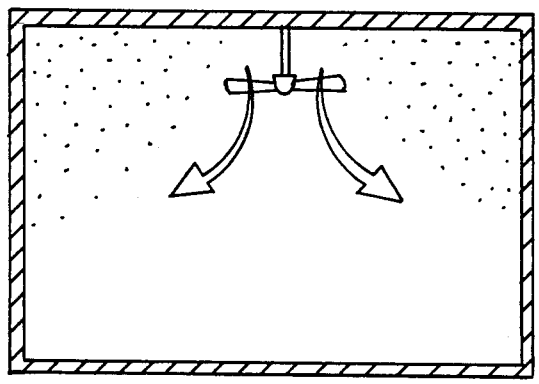

This design is mainly based on a thermally operated switch to control the fan positive/reverse operation periodically, as shown in FIG. 1, the circuit characteristic are as follows:

A single phase capacitor start-capacitor run motor which has a winding W1 and a winding W1'. These can be used alternately and interchangeably as a starting winding and a running winding, and can be the same size or different windings. If the size are the same, the clockwise/counter-clockwise output horse powers are the same; if the windings are different, the output horse power are different. Each one end of the above mentioned windings W1 and W1' are connected together then seraily connected to one line of the power source through a speed control switch SW3. The other end of winding W1 is connected to terminal 201' of a thermally operated switch SW2 and the other end of winding W1' is connected to terminal 202' of switch SW2. A start-run capacitor C1 is connected across said other ends of windings W1 and W1'.

The thermally operated switch is SW2 has a bi-metal arm 220, a normally open contact 202 and a normally closed contact 201. The common 200 is mounted at the end of arm 220 which is connected to terminal 200'. The bi-metal arm will close the common point contact 200 and the normally closed contact 201 under the normal temperature, and when it is heated to the saturation temperature, it is activated and closes the common contact 200 and the normally open contact 202 and cut off the connection to the normally closed contact 201. A heating resistor R210 is connected in parallel with the terminal 202' and terminal 200', so that it can be heated when the switch SW2 is at low temperature. When contact 200 and contact 202 are open, resistor R210 is in parallel with the capacitor C1, the bi-metal arm begins to accumulate heat until the common connect point 200 and the constant contact 201 opens, and contacts 200 and 202 close and no power is provided to the resistor. The fan will then be counter-clockwise operation. The above mentioned SW2 structure can be installed in a heat protective housing, or installed openly, or the thermo-resistor can be installed on the outside of the housing. The resistor can also be serially connected between the contact 201 and the motor M1. Its action is as the same that when the fan is running clockwise, the thermo-resistor is heated because of serial connecting to the load. Before the heat control switch accumulates enough heat, the fan will keep on clockwise revolving. After the heat saturated switching, the fan will revolve counter-clockwise and the power provided to the resistor is interrupted, the heat control switch is then cools and resumes to its original status which forms the periodic cycle. If a variable resistor VR230 is connected in parallel or in series with resistor R210, the heat accumulation time can be adjusted.

An operation function selection switch SW1 has a common contact 100, contact 101 for clockwise operation, a periodic cycle contact 102, and a counter-clockwise contact 103. The common contact 100 is connected to the other line of the power source, and the clockwise(CW) contact 101 is connected to the connection point of the capacitor C1, the winding W1 and terminal 201' of the control switch SW2 as above mentioned. The counter-clockwise contact 103 is connected to the common connection point of terminal 202' of switch SW2 and the other end of the capacitor C1 and winding W2. The periodic cycle contact 102 is connected to the terminal 200' of the switch SW2. The above circuit has the following functions.

(1) when the SW1 is set to connect the common contact (COM) 100 and the clockwise point (CW) 101, the fan will be in clockwise on-line operation, (2) when the SW1 is set to connect the COM 100 and the cycle contact 102, the power will go through the common contact 200 and the contact 201 to drive the motor to run clockwise, and the resistor is heated. After a certain time, as the resistor has accumulated enough heat, the switch contact 200 will connect to the contact 202, the motor will run counter-clockwise. Since there is no power provided to the thermo-resistor, the switch will cool. When the switch is cooled enough, the motor will return to clockwise operation. The operation is repeated again and again.

(3) when the switch is set to connect the common point 100 and the counter-clockwise contact 103, the motor will keep on counter-clockwise operation.

FIG. 1—1 is the implementation example which enhances the cut off capacity by using the higher rated motor with a aid of auxiliary Relay, in and figure we can see:

The relay RY301 has a common connection point 303, and a constant open connection point 302, the constant close connection point 301 that replace the connection point sets of the heat control switch in FIG. 1 to perform the same connection with the motor and the operation switch; the thermo-resistor R210 is parallel connection to the connection point pin 300' and 301' of the 300 and 301, or just serial connected between the pin 302' and the motor winding, and the heat can be conducted to the heat control switch SW4 which has a constant close connection point sets;

the heat control switch SW4 is normal temperature close type, its connection point is serial connected with the auxiliary relay RY301 coil, then parallel connected to the pin 102 of the connection point SW1 of the function selcetion switch and the coaxial switching pin 102' of SW1'; the switch SW1' is operated coaxially with SW1, its power side connection point 100' is connected to the common connector of the operation control switch and the motor;

if the connection point of the heat control switch SW4 is normal temperature open type, then its thermo-resistor is connected to the pin 300' and 302' of the connection points 300 and 302, or just serial connected between pin 301' and the motor winding, and the heat is conducted to the heat control switch.

To sum up the above detailed description, this is a special design for the air stirring fans such as ceiling fans, and draft fans that can be clockwise/counter clockwise operated periodically. FIGS. 2-5 are functional diagramatic drawings of FIG. 1, and can increase the room temerature equality, eliminate the dead space, shorten the indoor/outdoor air exchanging time, and increase the efficiency of air inhale/exhault fans.

I claim:

1. A control circuit for periodically reversing the direction of rotation of a fan motor, said fan motor being of the single phase, capacitor-start, capacitor-run type and receiving input power from a two line, alternating current power source, said fan motor including first and second windings and a capacitor, one end of each of said windings being connected together and to a first one of said two lines of said power source, said capacitor being connected between the ends of said windings opposite said one ends thereof, said control circuit comprising:

a thermally operated, single-pole, double-throw-switch, said switch having an arm, a common contact mounted on said arm, a normally closed contact and a normally open contact, said arm being constructed of bi-metal and responsive to temperature to change its position from a first position to a second position, the first said position of said arm being that position in which said common and said normally closed contacts are in engagement and the temperature of said arm is at ambient temperature, the second said position of said arm being that in which said common and said normally open contacts are in engagement and the temperature of said arm is above ambient;

means connecting said common contact to a second one of said two lines of said power source;

means connecting said normally closed contact to the junction point between said capacitor and said opposite end of said first winding;

means connecting said normally open contact to the junction point between said capacitor and said opposite end of said second winding;

a heating resistor adapted to raise the temperature of said arm above ambient when said resistor is energized by said power source; and means connecting said resistor between said common contact and said normally open contact to receive energy from said power source when said common contact and said normally closed contact are in engagement, whereby said motor will rotate in a first direction when said common and said normally closed contacts are in engagement and said motor will rotate in a direction opposite to said first direction when said common and said normally open contacts are in engagement.

2. A control circuit as claimed in claim 1, wherein said means connecting said common contact of said thermally operated switch includes;

a manually operated selector switch, said selector switch having a common contact and first, second and third contacts selectively engageble by said common contact thereof;

means connecting said common contact of said selector switch to said second one of said lines of said power source;

means connecting said first contact of said selector switch to the junction point between said capacitor and the first of said windings;

means connecting said second contact of said selector switch to said common contact of said thermally operated switch; and means connecting said third contact of said selector switch to the junction point between said capacitor and the second of said windings;

whereby said motor will rotate continuously in a first direction when said common end said first contacts of said selector switch are in engagement, and will rotate continuously in a direction opposite to said first direction when said common and said third contacts of said selector switch are in engagement, and will periodically alternate between rotation in said first direction and in said opposite direction when said common and said second contacts of said selector switch are in engagement.

* * * * *